UNITED STATES PATENT OFFICE.

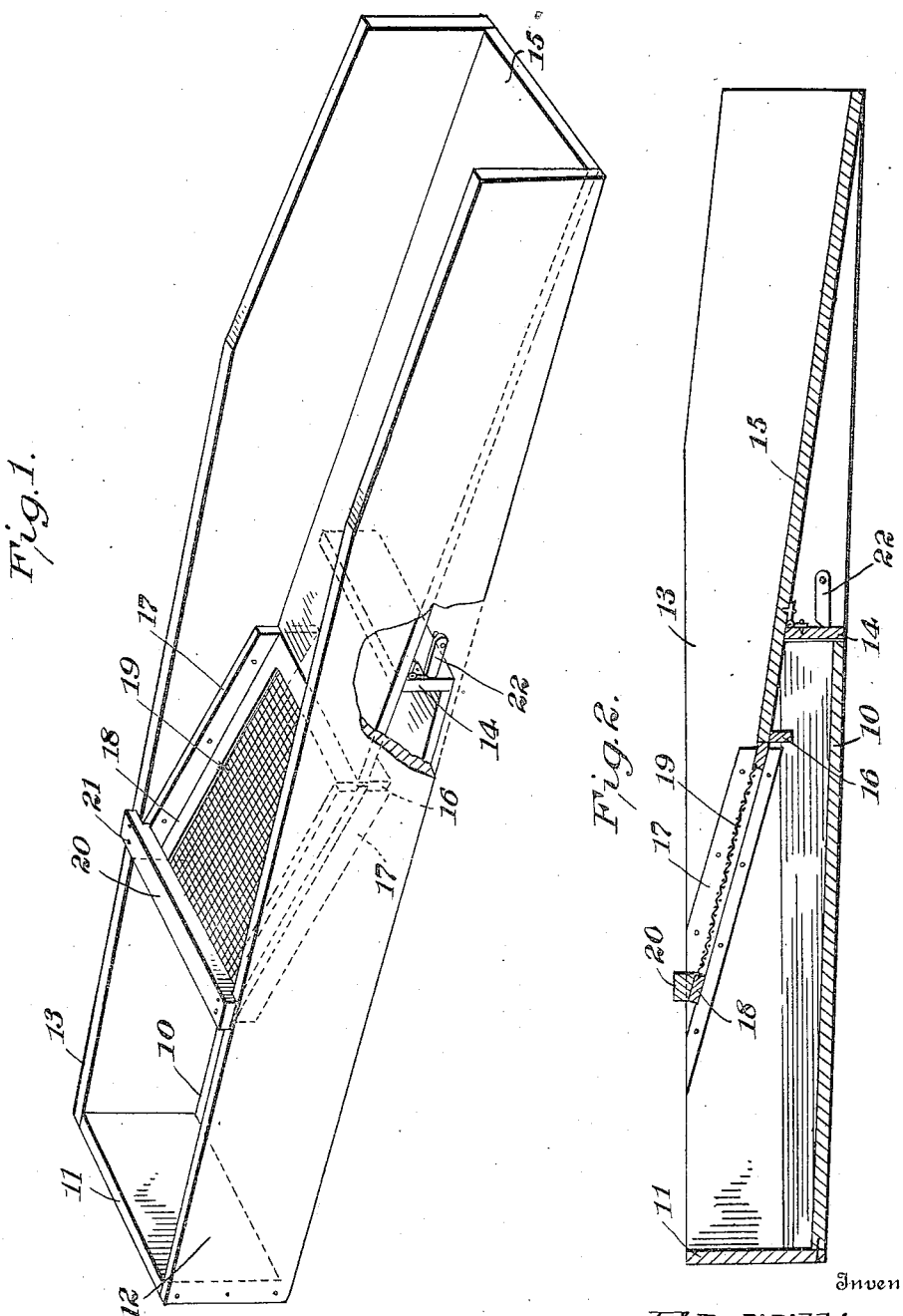

FRANKLIN L. WILLIAMS, OF TAMAROA, ILLINOIS.

LIQUID-STRAINER.

942,428.     Specification of Letters Patent.     Patented Dec. 7, 1909.

Application filed March 31, 1909. Serial No. 487,050.

*To all whom it may concern:*

Be it known that I, FRANKLIN L. WILLIAMS, citizen of the United States, residing at Tamaroa, in the county of Perry and State of Illinois, have invented certain new and useful Improvements in Liquid-Strainers, of which the following is a specification.

This invention relates to strainers or separators and has for an object the provision of a device whereby the momentum of a liquid traveling downwardly by the force of gravity is brought into communication with a screen in order to separate the liquid into its component parts according to the specific gravities of the same.

The invention has for another object the provision of a strainer which is provided with a trap to prevent the regurgitation of the denser liquid contained in the solution which is being strained and which admits of the passage of the lighter liquid through the device.

The invention further contemplates the provision of a device of this character which is so constructed that strainers of various mesh and formed of various materials may be employed and may be readily positioned within the same without the necessity of reconstructing the entire device.

The invention has for a still further object the provision of a device which accomplishes the above enumerated features and which at the same time is comparatively of simple structure and comprises but few parts so as to produce an efficient device which may be economically manufactured and adapted for general use.

For a full understanding of the invention reference is to be had to the following description and accompanying drawings, in which:—

Figure 1 is a perspective view of the complete separator, part of the same being broken away in order to disclose the trap in section. Fig. 2 is a vertical longitudinal section through the device.

Corresponding and like parts are referred to in the following description and indicated in all the views of the drawings by the same reference characters.

Referring to the drawings the numeral 10 designates a bottom which is provided with a rear end wall 11 and sides 12 and 13. The bottom 10 is terminated at a point intermediate of the sides 12 and 13 and is provided with a door 14 at its outer extremity which is adapted to close the end of the bottom 10 and to engage at its upper edge against the under side of an inclined bottom 15. The inclined bottom 15 extends diagonally in the forward end of the device between the walls 12 and 13 and is positioned between the forward lower edges of the sides 12 and 13 and extended backwardly and upwardly to a point inwardly of the door 14. The inner end of the bottom 15 is provided with a depending flange 16 which is adapted to partially close the chamber included between the same and the door 14, admitting entrance to the same only along the bottom 10. The sides 12 and 13 are provided with beads 17 which are diagonally disposed and continued substantially in the same plane with the inclined bottom 15 and extended backwardly from the same. The beads 17 are positioned in pairs and in registered relation upon the opposite inner faces of the sides 12 and 13 and are arranged to slidably support a frame 18 which carries a suitable screen 19. The upper or inner end of the frame 18 is provided with a cross-brace 20 which extends slightly beyond the sides of the frame 18 and engages upon the upper edges of the sides 12 and 13 in order to enable the securing of the frame 18 in position by means of screws 21 or the like. The forward ends of the sides 12 and 13 are preferably beveled at their upper edges in order to conform to the inclination of the bottom 15 to produce walls of uniform height.

The forward end of the device is opened in order to allow the exit of the liquid after passing from the screen 19 down the inclined bottom 15.

The trap door 14 is held in position by means of lugs 22 which are pivotally disposed against the inner faces of the sides 12 and 13 and engaged against the outer face of the door 14 to impinge the same against the bottom 10.

In employing this separator the liquid which is to be separated is poured into the upper end of the device adjacent the end wall 11, the device being positioned at an angle in order to raise the inner end of the same, when the liquid by the force of gravity will travel downwardly along the bottom 10 and will engage the flange 16, the denser portion of the liquid falling to the bottom 10 and passing beneath the flange 16 into the trap formed between the flange 16 and the door 14. After this dense liquid is carried into the trap the momentum of the same causes a tendency for it to flow backwardly and intermingle with the lighter portion of the liquid, but owing to the provision of the flange 16 this regurgitation is prevented and the denser portion of the liquid is held in the trap. The lighter liquid passes upwardly at an angle through the screen 19 and is conveyed over the inclined bottom 15 to the forward end of the device where it is conveyed or carried off in a suitable manner.

By reason of the employment of beads 17 the screen 19 may be removed by withdrawing the frame 18 from engagement between the beads 17 and a new screen may be inserted, the meshing of which may be formed of various materials in accordance with the nature of the liquid which is passed through the same.

When it is desired to remove the dense liquid from the trap the lugs 22 are disengaged from the door 14 and the same is opened whereby the denser liquid is permitted to flow from the bottom 10.

Having thus described the invention what is claimed as new is:—

1. A device as specified comprising an elongated trough, an inclined bottom mounted at the outer end of said trough and adapted to overlap the bottom of the trough intermediately thereof, a door positioned beneath the inner end of said inclined bottom and the outer end of the bottom of the trough, a flange depended from the inner extremity of the inclined bottom and a screen mounted in said trough intermediately thereof and in the plane of the inclined bottom adapted for separating liquid which is passed upwardly therethrough.

2. A device as specified comprising two sides, an end wall carried by said sides, a bottom positioned between said sides and said end wall and extended from an intermediate point of said sides, a door carried upon the end of the bottom and extended upwardly therefrom, an inclined bottom engaged on the upper edge of said door and extended forwardly therefrom between said sides, said inclined bottom extended inwardly from said door, a flange depended from the inner end of said inclined bottom to form a trap in conjunction with said door and a screen mounted intermediately of said sides and positioned in the plane of said inclined bottom.

3. A device as specified comprising an elongated body portion, a straight bottom in said body portion, an inclined bottom disposed in said body portion and overlapped in relation to said first bottom, a trap formed between said sides at the adjoining ends of the same and a screen positioned over said first bottom and disposed in the plane of said inclined bottom to strain liquid passed upwardly therethrough.

4. A device as specified comprising an elongated body portion, a bottom formed in said body portion and extended approximately half the length thereof, an inclined bottom positioned in said body portion at the opposite end thereof, the inner raised end of said inclined bottom being positioned in overlapped relation to said first bottom, a flange depended from the raised end of said inclined bottom, a door positioned between the end of said first bottom and the under face of said inclined bottom and a screen disposed in said body portion in the plane of said inclined bottom and adapted for straining a liquid poured in said body portion.

5. A device as specified comprising two sides a bottom extended approximately half the lengths of said sides, a door upwardly extended from the end of said body between said sides, an inclined bottom carried between said sides and extended outwardly from said first bottom, the raised end of the same being engaged on said door and extended inwardly therefrom, a flange depended from the inner extremity of said inclined bottom, beads disposed in pairs and in registered relation against the opposite inner faces of said sides, a frame slidably disposed between said beads, a screen mounted in said frame and a cross-brace secured to the upper end of said frame for engagement upon the upper edges of said sides to support said frame rigidly in position.

6. A device as specified comprising an elongated trough, a bottom formed approximately one-half the length of the trough, an inclined bottom formed in the opposite end of said trough and disposed in overlapped relation of said first bottom, a door positioned between said bottoms at the outer end of said first bottom, a flange depended from the inner end of said inclined bottom to form a trap for dense liquid, a screen disposed in said trough to form a continuation of the inner end of said inclined bottom and means for releasing said door at times to remove the denser liquid from said first bottom.

7. A device as specified comprising an elongated body portion, a bottom positioned in said body portion, a door mounted in said body portion and engaged at its lower free extremity against said bottom, a second bottom positioned in said body portion and spaced above said first bottom to support said door, said second bottom extending rearwardly of said door, a flange depended from said second bottom at a distance rearwardly of said door and a screen diagonally disposed in said body and extended backwardly from said bottom.

8. A device as specified comprising a body portion, a bottom in said body, a second bottom in said body spaced upwardly from said first bottom, a door depended from said second bottom and engaged with said first bottom, a flange depended from said second bottom rearwardly of said door and a screen upwardly extended in said body from the rear end of said second bottom.

9. In a device as specified the combination of a body, a bottom in said body, an overhanging portion in said body, a door depended from said overhanging portion to form a trap, a flange depended from said overhanging portion rearwardly of said door and a screen upwardly diverged from said body from the rear end of said overhanging portion.

In testimony whereof I affix my signature in presence of two witnesses.

FRANKLIN L. WILLIAMS. [L. S.]

Witnesses:
 FRANK LEE,
 C. M. GADDIS.